United States Patent [19]

Matsuda et al.

[11] 4,442,061

[45] Apr. 10, 1984

[54] HEAT CYCLE INJECTION COMPRESSION MOLDING METHOD

[75] Inventors: Shunsuke Matsuda, Osaka; Akio Ito, Katano; Mitani Katsuaki, Kyoto; Murakami Yoshinobu, Katano; Tamura Tooru, Ikeda, all of Japan

[73] Assignee: Matsushita Electric Industrial Co., Ltd., Osaka, Japan

[21] Appl. No.: 398,696

[22] Filed: Jul. 15, 1982

[30] Foreign Application Priority Data

Jul. 16, 1981 [JP] Japan ............................ 56-111775

[51] Int. Cl.³ .................................................... B29F 1/06
[52] U.S. Cl. .............................. 264/328.7; 264/328.16
[58] Field of Search .......................... 264/328.7, 328.16

[56] References Cited

U.S. PATENT DOCUMENTS

| | | | |
|---|---|---|---|
| 3,632,729 | 1/1972 | Bielfeldt | 264/328.7 X |
| 4,094,952 | 6/1978 | Frank | 264/328.7 |
| 4,290,744 | 9/1981 | Dannels | 264/328.7 X |
| 4,309,379 | 1/1982 | Dannels | 264/328.7 X |
| 4,364,878 | 12/1982 | Lalibute | 264/328.7 X |
| 4,370,122 | 1/1983 | Dannels | 264/328.7 X |
| 4,370,123 | 1/1983 | Dannels | 264/328.7 X |

Primary Examiner—Thomas P. Pavelko
Attorney, Agent, or Firm—Wenderoth, Lind & Ponack

[57] ABSTRACT

A heat cycle injection compression molding method comprises several steps: heating a synthetic resin until it becomes fluidized; injecting the fluidized synthetic resin into a large and nonuniform cavity formed by a cavity block and a mold which is slightly opened; cooling the injected fluidized resin until the center portion temperature of the resin is equal to or lower than a solidifying temperature of the resin, thereby solidifying the resin; reheating the solidified resin uniformly until the temperature of the resin is higher than the solidifying temperature, thereby making the resin fluidized again; compressing the refluidized resin by reducing the volume of the cavities; cooling the refluidized resin until the temperature of the refluidized resin is lower than a take-out set temperature, while continuing the compressing step, thereby resolidifying the resin; stopping the compressing step; and ejecting out of the mold a formed product having a large and nonuniform thickness.

3 Claims, 11 Drawing Figures

During injection

During compression

|  | I | II | III |
|---|---|---|---|
|  | Themoregulator 21 | Thermoregulator 22 | Steam |
| $V_1$ | OFF | OFF | ON |
| $V_2$ | OFF | OFF | OFF |
| $V_3$ | OFF | OFF | ON |
| $V_4$ | OFF | OFF | OFF (ON) |
| $V_5$ | OFF | OFF | ON |
| $V_6$ | OFF | ON | OFF |
| $V_7$ | ON | OFF | OFF |
| $V_8$ | OFF | ON | OFF |

FIG. 8

| A | I — II — III |
|---|---|
| B | I — II |

FIG. 9

| Temp. | I<br>$T_5$<br>(Thermoregulator 21) | II<br>$T_6$<br>(Thermoregulator 22) | III<br>$T_8$ |
|---|---|---|---|
| $V_1$ | OFF | OFF | ON |
| $V_2$ | OFF | OFF | OFF |
| $V_3$ | OFF | ON | OFF |
| $V_4$ | ON | OFF | OFF |
| $V_5$ | OFF | ON | OFF |
| $V_6$ | OFF | OFF | OFF |
| Heater | OFF | OFF | ON |

FIG. 11

HEAT CYCLE INJECTION COMPRESSION MOLDING METHOD

BACKGROUND OF THE INVENTION

1. Field of the Invention

This invention relates to an injection compression molding method and a temperature control apparatus for performing the same method.

2. Description of the Prior Art

The conventional injection compression molding method, which uses either improved metallic molds for injection molding or improved metallic molds for compression molding, is performed in such a manner that the metallic molds are previously warmed and synthetic resin is injected therein. Then gate portion is mechanically sealed or the smaller thickness portion at the gate is cooled and solidified to be sealed so that synthetic resin filled in the cavity is restrained from counterflowing from the gate, thereby performing the compression. The metallic molds are opened after cooling and setting the synthetic resin within the cavity so that the molded product may be taken out. In addition, the temperature control of metallic molds in the molding cycle is performed by keeping a constant temperature throughout one molding cycle, or by heating the metallic molds just before injection and rapidly cooling them after injection compression.

The conventional injection molding method, when intended to mold the article larger in thickness or nonuniform in thickness, easily leaves sink marks or a residual stress-strain. In spite of that, the molded product conventionally is thrown into water to be cooled for shortening the molding cycle. Conventionally, in order to restrict the sink marks from being created when the temperature of synthetic resin is high, it is necessary to apply a high pressure to the synthetic resin by means of an injection pressure or a high compression pressure by the injection compression molding apparatus. In order to accomplish this result, an injection cylinder must be given a ultra-high pressure, or the high compression pressure molding must be performed. For example, the catalogue of the injection molding machine called Coining Machine (Sandwich Press in synonym) manufactured by ENGEL CORPORATION in Australia, describes that it is preferable to inject synthetic resin under a pressure of 300 to 400 kg/cm$^2$ and to apply to it a compression pressure of 700 to 800 kg/cm$^2$. In usual compression molding, however, the compression pressure of 100 to 800 kg/cm$^2$ is applied perpendicularly, which differs considerably from the compression pressure for the aforesaid injection compression molding machine. Hence, the injection compression molding machine will require a remarkably excessive mold clamping force in comparison with the compression molding machine.

SUMMARY AND OBJECTS OF THE INVENTION

Therefore, it is an object of the present invention to provide a molding method which is capable of molding an article, being large and nonuniform in thickness, in a good transfer efficiency with respect to metallic molds and of molding the article under lower compression pressure.

It is another object of the present invention to provide a temperature control apparatus capable of effectively performing the aforesaid molding method.

BRIEF DESCRIPTION OF THE DRAWINGS

These and other objects, features and advantages of the present invention will become more apparent from the consideration of the following descriptions taken with the accompanying drawings in which:

FIG. 8 shows on-off operations of the valves in every process for thermoregulators and steam;

FIG. 9 shows the correlation between the process in FIG. 6 and the operations of valves in FIG. 8;

FIG. 11 shows the relation between the on-off operations of valves and the on-off position of an electric power source in every process.

DETAILED DESCRIPTION OF THE PREFERRED EMBODIMENTS

An embodiment of a heat cycle injection compression molding method of the present invention will be described in FIGS. 1 through 4, which method can mold a product with accuracy under a compression pressure about equal to that of the compression molding machine or an injection pressure of the injection molding machine.

Next, an embodiment of a temperature control apparatus of the heat cycle injection compression molding method of the present invention will be described in FIGS. 5-11, which apparatus can control the temperature of a product with accuracy under a compression pressure about equal to that of the compression molding machine or an injection pressure of the injection molding machine.

Figure 1:
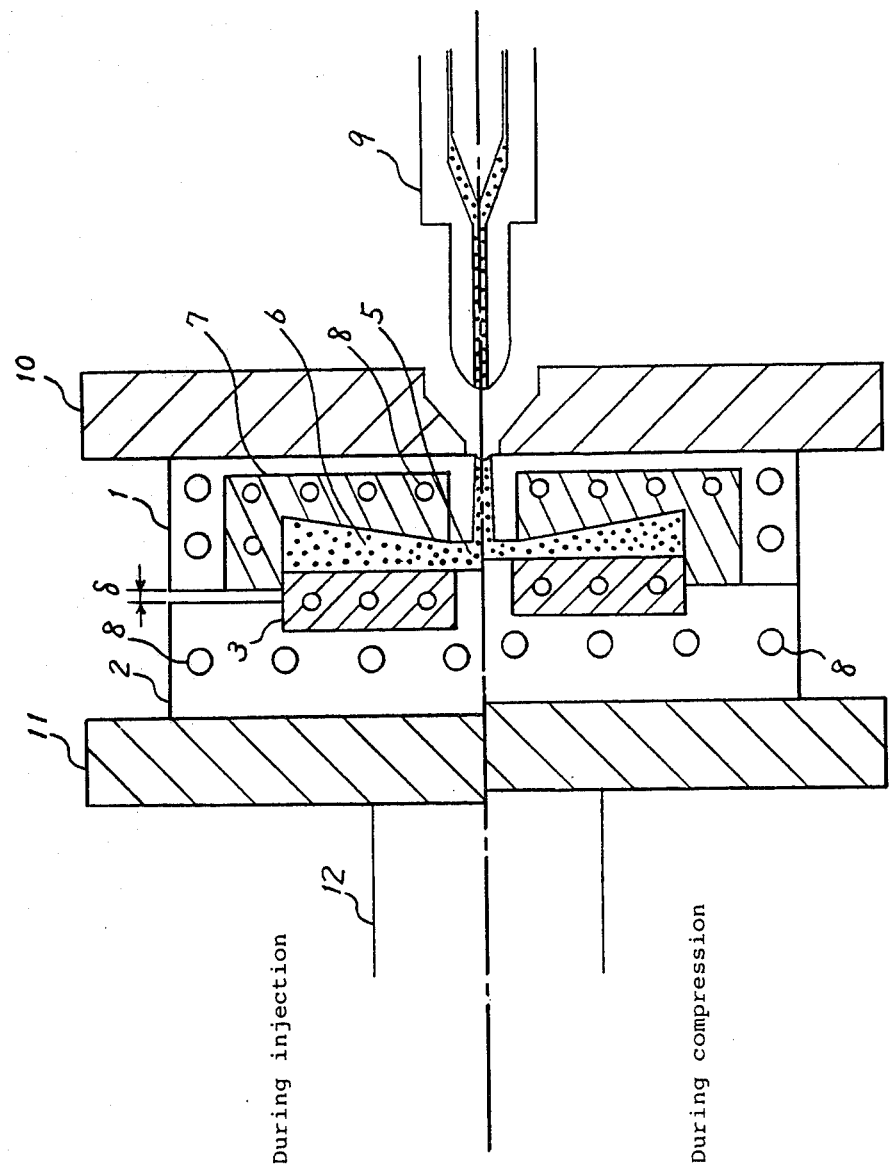
FIG. 1 is a sectional view of the principal portions of metallic molds used for the molding method of the invention.

FIG. 1 shows exemplary metallic molds and a cavity therebetween used for the molding method of the invention, in which reference numeral 1 designates a template at the stationary side and 2 designates a template at the movable side, the templates 1 and 2 providing cavity blocks 3 and 7 constituting a cavity 6 into which synthetic resin is to be filled.

The cavity blocks 3 and 7 are of fitting construction to each other so that the resin, filled in fluidized condition, even when the metallic molds are not completely closed as shown in FIG. 1, is adapted not to leak outwardly. The metallic molds, as shown, span a gap only of δ therebetween so that the cavity 6 is made larger in thickness to that extent.

Figure 5:
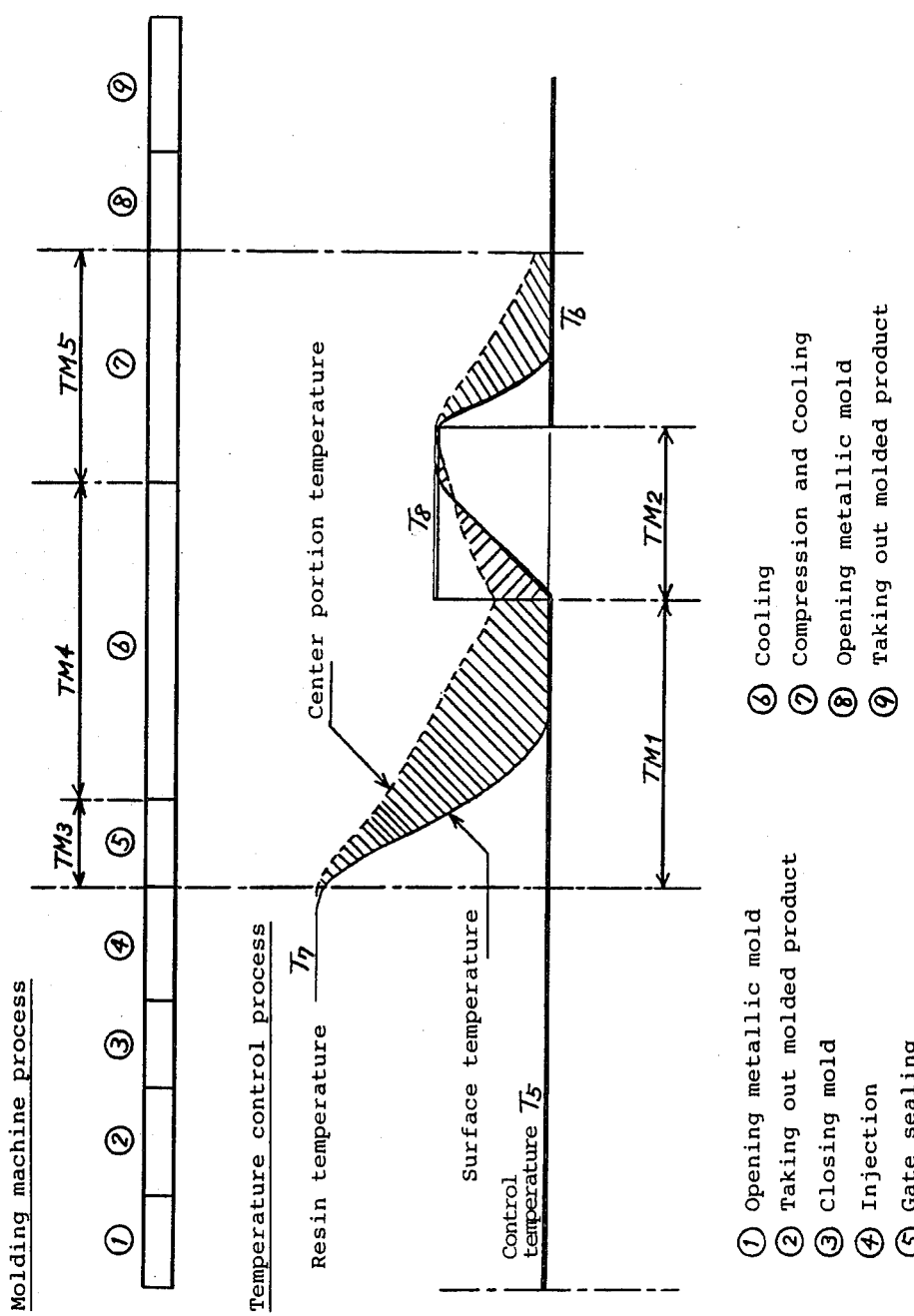
FIG. 5 shows the timing correlation between the molding machine process and the temperature control process.

The cavity blocks 3 and 7 also are provided with bores 8 through which a medium for temperature control flows. In a case of the stem heating—hot water cooling aspect of the invention, steam passes through each bore 8 for a time and hot water passes through the same bore 8 for another time in accordance with the timing as shown in FIG. 5. In a case of heating by an electric heater or by induction heating, electric heaters or heat coils are inserted through a part of bores 8 and hot-water flows through the remaining bores 8.

The template 1 is mounted on a fixed die-plate 10 and the template 2 on a movable die-plate 11, the template 2 being movable forwardly and backwardly by a mold clamping cylinder ram 12 to thereby open the metallic molds to take out the molded article in backward movement of the template 2. Ram 12 brings the templates 1, 2 together and compress the synthetic resin filled therein in the forward movement of the template 2.

When the same temperature control program is executed on the templates 1 and 2 and cavity blocks 3 and 7, the templates (1,2) and cavity blocks (3,7) of course use their bores 8 as the passages for steam, hot water and others, in the same condition. In some cases, however, gaps are provided for heat insulation between the template 1 and the cavity block 7 and between the template 2 and the cavity block 3, or heat insulators are used to thermally separate the templates 1 and 2 from the cavity blocks 7 and 3 are respectively, so that the templates 1 and 2 each are kept at a constant temperature and only the cavity blocks 3 and 7 are set at various temperatures during one cycle. This arrangement is effective for changing over the temperature control of the cavity from one to another temperature.

The metallic molds in FIG. 1-upper halves are moved slightly away from each other to enlarge the cavity 6 in thickness by a gap $\delta$ only and resin is injected by use of an injection unit 9 into the cavity 6 and filled therein, and then a clamping force in accordance with the compression timing in the temperature control program acts on the templates 1 and 2 to make the gap $\delta$ nought so that the templates 1 and 2 are disposed relative to each other as shown in FIG. 1 lower half, in which a volume of cavity 6 is compressed only by $\delta$ and the resin is set so as to be molded.

Figure 2:
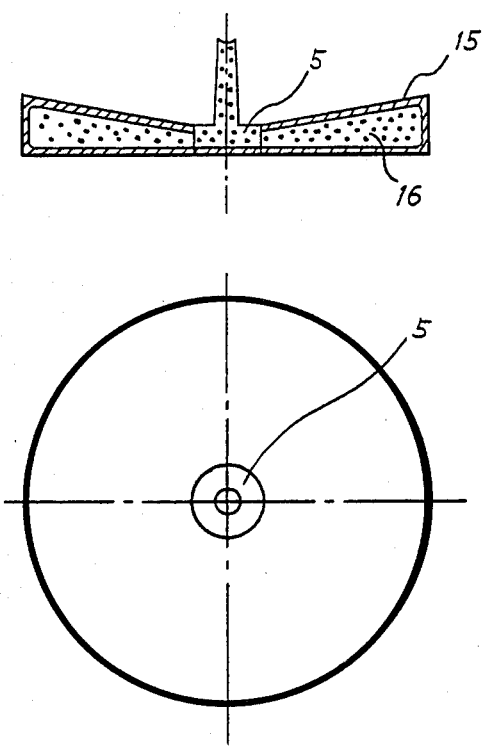
FIG. 2 is a sectional view of an article in the molding process.

In this case, in order to prevent the resin from leaking through the gate, a forcible cutoff of a gate 5 best shown in FIG. 2 (disclosed in Japanese Patent Laid-Open No. Sho 50-21054), or the provision of an anti-counterflow valve at the injection unit 9, has been proposed. These constructions are both available for the above purpose, but the metallic molds of the parting line coupling system as proposed by the Japanese Patent Application No. Sho 56-11779 can be used to more effectively carry out the resin leakage prevention feature of the present invention.

Next, explanation will be given on the molding cycle, metallic mold temperature characteristic A in FIG. 4a, and resin temperature characteristic B in FIG. 4a in accordance with the FIG. 3 flow chart and FIGS. 4a and b showing the relation between the temperature cycle and the molding operation, where the temperature control for the metallic molds, as seen from FIGS. 4a and b, is, in brief, varied in three steps of "take-out set temperature $T_1$", "metallic mold temperatures $T_2$ and $T_3$ during the injection" and "fluid temperatures $T_4$ and $T_5$" in the increasing order in accordance with one molding cycle.

Figure 3:
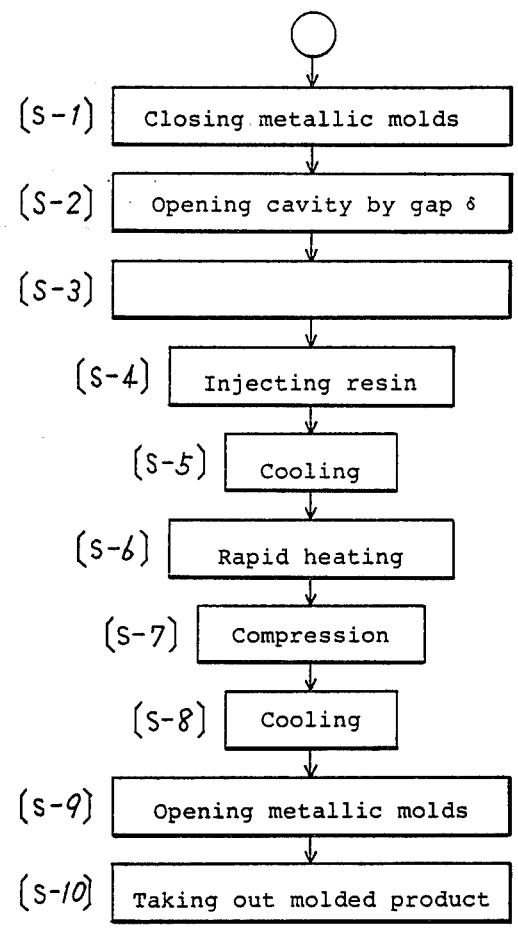
FIG. 3 is a flow chart of the molding cycle.
Figures 4A, 4B:
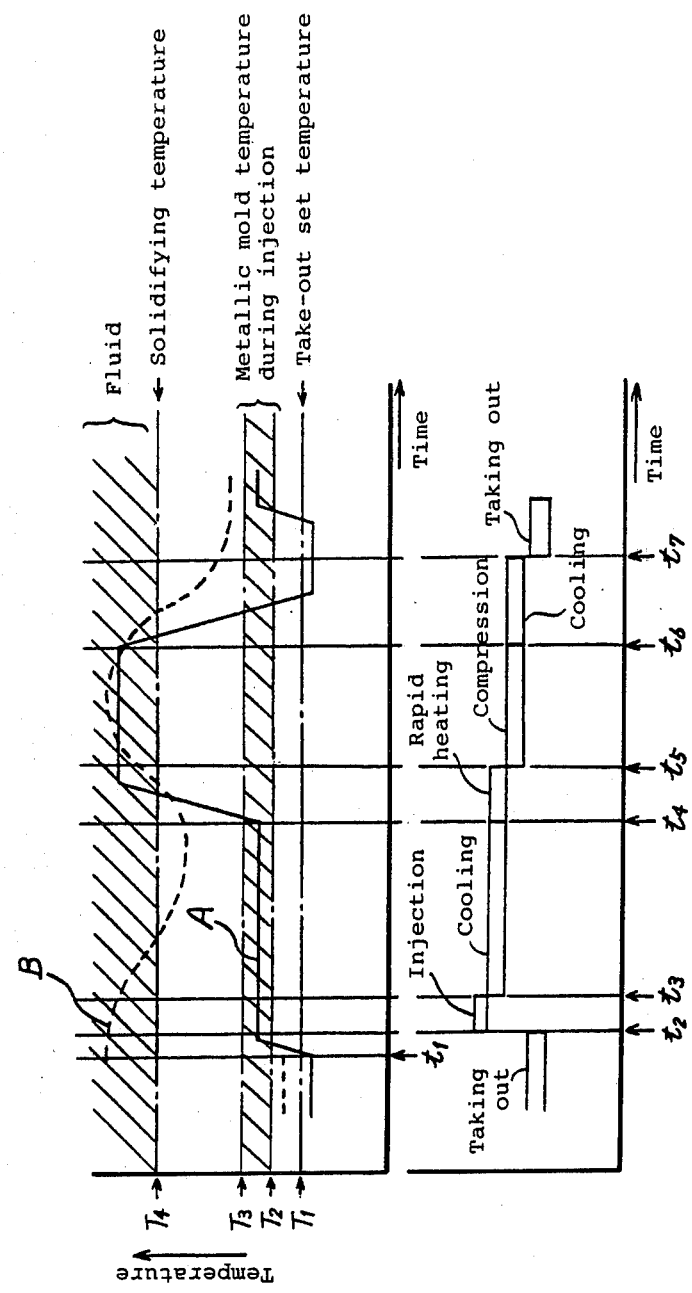
FIGS. 4a and b are views explanatory of a relation between the metallic mold temperature, the resin temperature, and the molding cycle.

In FIGS. 3 and 4, the metallic molds at a lower temperature than the take-out set temperature $T_1$ when the article molded in the preceding molding cycle is taken out, is closed (s-1) so that they are set at the metallic mold temperatures $T_2$ to $T_3$ during the injection to prepare for the subsequent molding cycle, and then the cavity 6 is kept open a little by the gap $\delta$ (s-2). Upon detecting the metallic mold temperature reaching the mold temperatures $T_2$ to $T_3$ in the injection after rising since the time $t_1$ (s-3), resin fluidized at a temperature equal to or higher than the solidifying temperature $T_4$ is injected into the cavity 6 through the gate 5 at the time $t_2$ for the above detection (s-4). After the step s-4 is over, the program is transferred to the cooling step s-5 following the time $t_3$, and then transferred to the rapid heating step s-6 at the time $t_4$ when the resin temperature represented by the characteristic B as a whole is detected to be equal to or lower than the solidifying temperature $T_4$. In further detail, when synthetic resin of the article even at the center of the portion of the maximum thickness is detected to be equal to or lower than the solidifying temperature $T_4$ in the step s-5, the step s-6 of rapid heating is carried out while keeping the synthetic resin at the gate 5 portion not molten.

FIG. 2 shows distribution of a fluidized bed 15 and a solid phase 16 when the step s-6 of heating is carried out keeping low a temperature at the portion in the vicinity of the gate 5. When the synthetic resin within the cavity 6 is heated rapidly in the step s-6 and the temperature of its surface layer is detected to be equal to or higher than the resin solidfying temperature $T_4$, the program is transferred to the step s-7 of compression at the time $t_5$ of the detection, wherein the compression step s-7 is carried out to close the cavity 6 so that the gap $\delta$ decreases toward zero. During the step s-7 of compression, the surface layer of synthetic resin filled within the cavity 6 in a slightly short volume by the step s-4 of injection is fluidized along the inner surfaces of metallic molds and then the synthetic resin, at the time $t_6$, is cooled in the step s-8 while being applied with the mold clamping force, whereby the metallic mold temperature is lowered to the take-out set temperature $T_1$ or under, thus molding the resin in the predetermined configuration. Further, upon completion of the step s-8 of cooling, at time $t_7$ the metallic molds are opened to take out the molded article (the step s-9).

As seen from the above molding process, the synthetic resin within the cavity 6 is heated from the periphery of cavity 6 toward the interior thereof so that the compression step s-7 is executed in the state that the filled synthetic resin is made fluidized in a given thickness inwardly from the surface of resin, whereby the molded article, nonuniform in thickness, is less distorted than in molding a flat plate. Also, in the compression step s-7, the synthetic resin filled in a slightly short volume is molded while flowing along the inner surfaces of metallic molds, thereby remarkably improving the metallic mold working rate.

The step s-2 of slightly opening the cavity 6 is performable by the aforesaid Coining Machine or an injection compression molding machine, capable of desirably setting the mold position by use of an oil pressure control, a distance meter (or limit switch), and an oil pressure cylinder. Also, the step s-2 is performable by an apparatus having as a function to slightly open the cavity 6 as disclosed by the Japanese Patent Publication No. Sho 55-6054. Furthermore, the step s-7 of compression is performable by operating a metallic mold internally positioning mechanism instead of the mold clamping force applied to the molds.

The compression of step s-7, when using the aforesaid Engel's Coining Machine, is performable by moving forwardly the mold clamping cylinder, and, when using the metallic mold apparatus described in Japanese Patent Publication No. Sho 55-6054, is performable by removing a wedge within the metallic mold to allow the mold clamping cylinder to move forward to thereby carry out the compression molding. Incidentally, the compression pressure usually is about 100 to 300 kg/cm² and the pressure must be raised especially when the article is not uniform in thickness or a mold shrinkage percentage is required to be extremely reduced.

The metallic mold temperatures $T_2$ to $T_3$ during the resin injection is set in a proper value corresponding to the property of synthetic resin to be molded and an amount of allowable distortion thereof. In many cases, it is reasonable that the temperatures $T_2$ to $T_3$ are slightly higher than the standard value of metallic mold temperature provided by makers for each synthetic resin, for example, in a case of using acrylic resin the above temperature is set at the temperature of 85° to 110° C. In a case of using acrylic resin, the temperature $T_4$ of 130° to 160° C. is economically proper.

Next, explanation will be given on a temperature control apparatus of the invention. FIG. 5 shows the timing correlation between the molding process and the temperature control process. A signal for opening the molds controls the temperature thereof to $T_5$ and the molds are kept at the temperature of $T_5$ for a time period of $TM_1$ after injection of synthetic resin, and then the temperature is controlled to $T_8$ for a time period of $TM_2$, and thereafter controlled to $T_6$ (where the temperature $T_5$ may be applicable, but it is preferable to effectively cool and solidify the resin at a temperature lower than $T_5$), the temperature control to $T_6$ being continued until the compression and cooling processes at the molding machine are completed, in other words, until the molds start opening.

The time periods of $TM_1$ and $TM_2$ are different according to shapes of molded products, kinds of synthetic resin, temperatures of resin when injected, and the heat exchange capability of the metallic mold, but the temperature of injected resin soon becomes $T_5$ in the vicinity of the surface of the resin and lowers later at the internally central portion so that the time period $TM_1$ is ended when the temperature at the internally central portion is equal to or slightly lower than the temperature $T_2$.

$TM_2$ is decided on a basis of a time period necessary for a temperature of the resin as a whole to be uniform because a temperature rises at the surface of resin when heated ahead of that at the internally central portion. It is desirous that the compression in the molding process is carried out slightly later so that the above decision is proper to be carried out when the resin is fit for the inner surface of cavity 6. Thereafter, the temperature control to $T_6$ starts.

Figure 6:
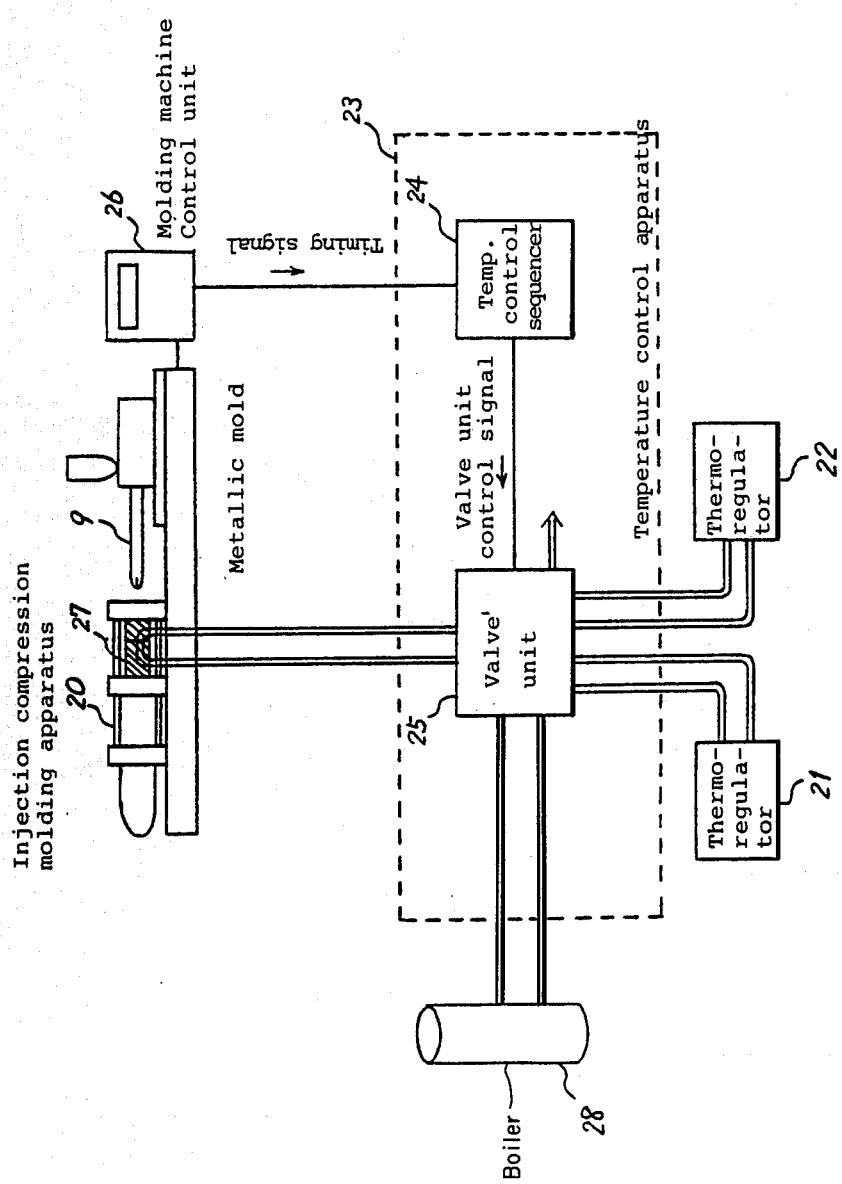
FIG. 6 is a connection diagram of an injection compression molding apparatus, a medium for temperature control, and the temperature control apparatus.

Next, FIG. 6 shows a case where water or hot water is used for the temperature control to $T_5$ to $T_6$ and steam is used for heating resin at the temperature $T_8$.

The temperature control apparatus 23 of the invention, as shown in FIG. 6, comprises a temperature control sequencer 24 and a valve unit 25, both of which are surrounded by the dotted line. Also, a connection diagram of the temperature control apparatus 23, a control unit 26 for the injection compression molding apparatus 20, metallic molds 27, a steam generating boiler 28, a thermoregulator 21, and a thermoregulator 22, is shown in FIG. 6. The temperature control apparatus 23 is given a timing signal from the molding apparatus control unit 26 so as to control the valve unit 25 for performing temperature control of the metallic molds 27.

Figure 7:
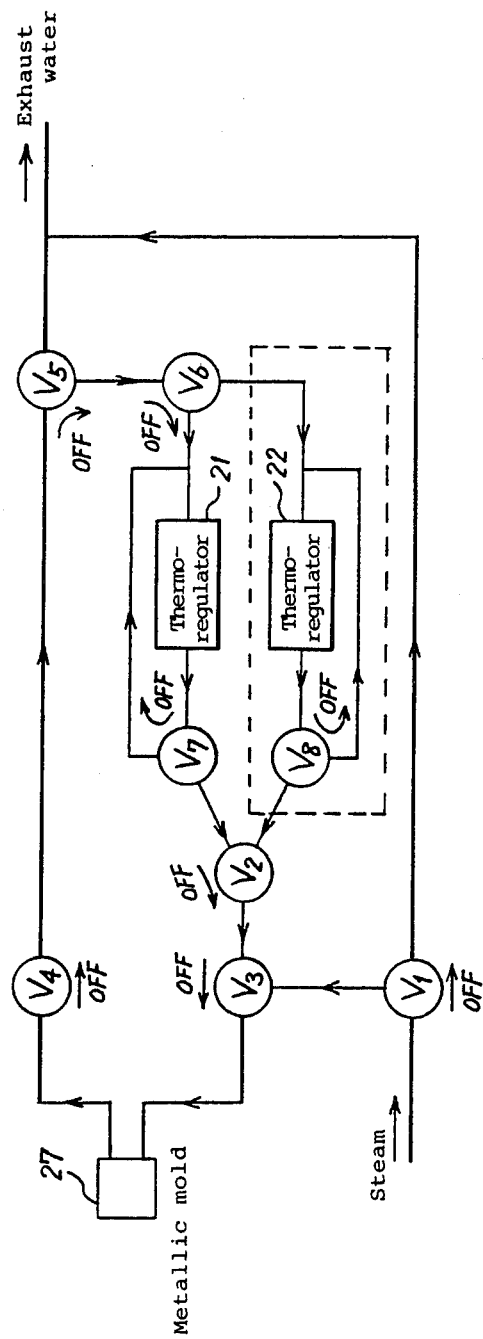
FIG. 7 shows an arrangement of valves in a valve unit.

The valve unit 25, as shown in FIG. 7, comprises a valve $V_1$ operated when steam is used for temperature control, valves $V_7$ and $V_8$ operated for circulating the steam when the thermoregulators 21 and 22 are not in use, a valve $V_5$ for draining water and steam, and a valve $V_4$ used for a stay of steam, where the arrows OFF in FIG. 7 show the flow direction of steam when the valves are off respectively.

FIG. 8 shows on-off condition of each valve when the valve unit is used to control the temperature by means of the thermoregulators 21 and 22 and steam. When the temperature control is performed in the sequence shown in FIG. 5 by use of the valve operation in FIG. 8, the steam, as shown in FIG. 9, is circulated in the cycle B when $T_5=T_6$ and in the cycle A when $T_5>T_6$, thereby carrying out the molding.

Incidentally, the hatched portion in FIG. 6 indicates the metallic molds 27 as shown in FIG. 1, wherein both the cavity blocks 3, 7 and metallic molds 27 are provided with the piping to allow steam or hot water to pass therethrough.

Figure 10:
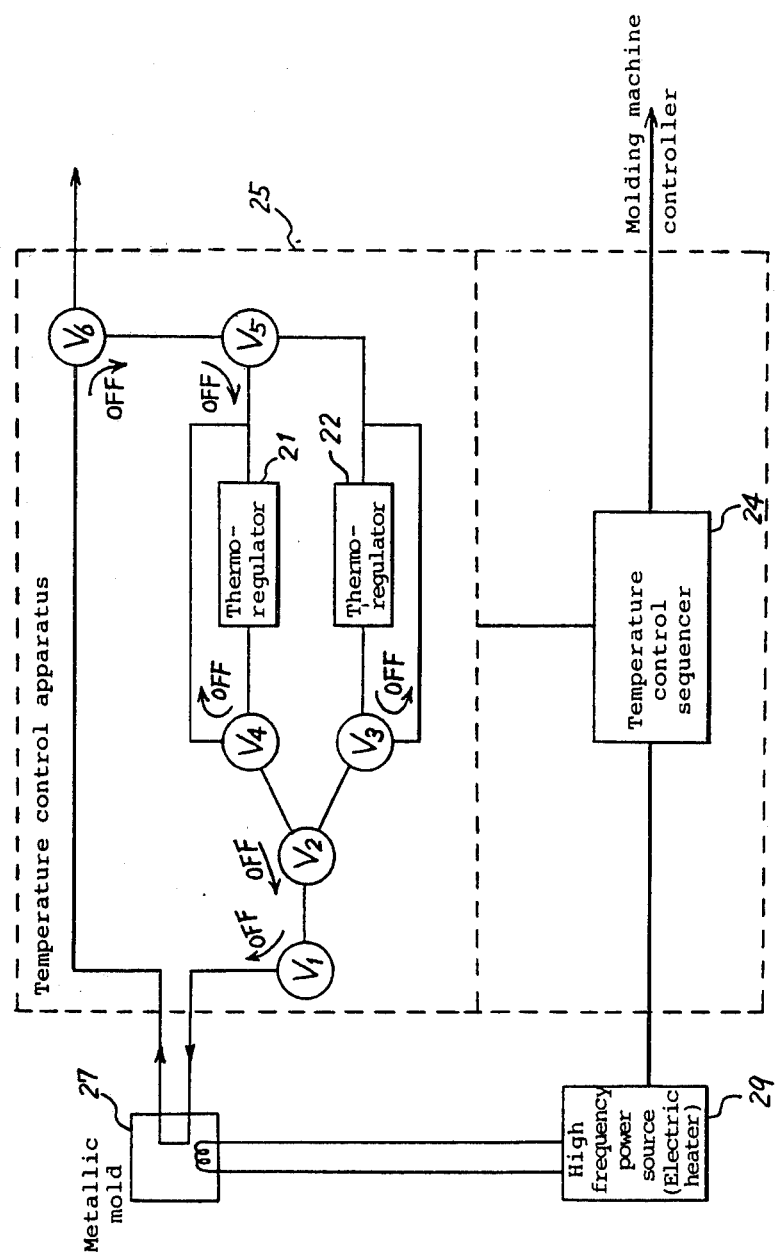
FIG. 10 is a view of a temperature control apparatus when using high-frequency heating, an electric heater and a hot-water thermoregulator.

The temperature control $T_8$ can use an electric heater or high-frequency heating other than steam. In this case, the temperature control apparatus using high-frequency heating instead of steam in FIGS. 6 through 9, is constructed as shown in FIG. 10, in which the upper portion surrounded by the broken line represents the valve unit 25 and the lower portion the temperature control sequencer 24, which drives external thermoregulators 21 and 22 and a high-frequency power source (or an electric heater) to thereby control the metallic mold temperature corresponding to the molding cycle, where the external thermoregulators 21 and 22 are not included in the present invention.

In addition, a temperature control signal, as shown in FIG. 5, controls the temperatures $T_5$, $T_6$ and $T_8$ in a different manner under the cycles shown in FIG. 9.

As seen from the above, the molding method of the present invention slightly opens the cavity 6 and injects thereinto synthetic resin in a somewhat short volume, the synthetic resin, after once cooled, being heated at the surface layer in the fluidized condition, and then closes the cavity 6 to compression-mold the resin, whereby an article, large and nonuniform in thickness, can be molded in a proper transfer efficiency with respect to the metallic molds and also under a low compression pressure usually of 100 to 300 kg/cm². Furthermore, this invention also renders the temperature control apparatus (23,25) capable of performing the aforesaid molding method of the invention.

What is claimed is:
1. A heat cycle injection compression molding method comprising the steps of:
    heating a synthetic resin until it becomes fluidized;
    injecting the fluidized synthetic resin into a large and nonuniform cavity formed by a cavity block in a mold which is slightly opened;
    cooling the injected fluidized resin until the center portion temperature of the resin is equal to or lower than a solidifying temperature of the resin, thereby solidifying the resin;

reheating the solidified resin uniformly until the temperature of the resin is higher than the solidifying temperature, thereby making the resin fluidized again;

compressing the refluidized resin by reducing the volume of the cavity;

cooling the refluidized resin until the temperature of the refluidized resin is lower than a take-out set temperature, while continuing said compressing step, thereby resolidifying the resin;

stopping the compressing step; and ejecting out of the mold a formed product having a large and nonuniform thickness.

2. The method as claimed in claim 1, wherein the synthetic resin is an acrylic, the solidifying temperature is 130° to 160° C., and the take-out set temperature is 85° to 110° C.

3. The method as claimed in claim 1, wherein the cavity block has plural bores through which steam is circulated for heating and water is circulated for cooling.

* * * * *